April 23, 1968   J. D. BORTZ   3,379,462
MOLDING ASSEMBLY
Filed Feb. 1, 1966
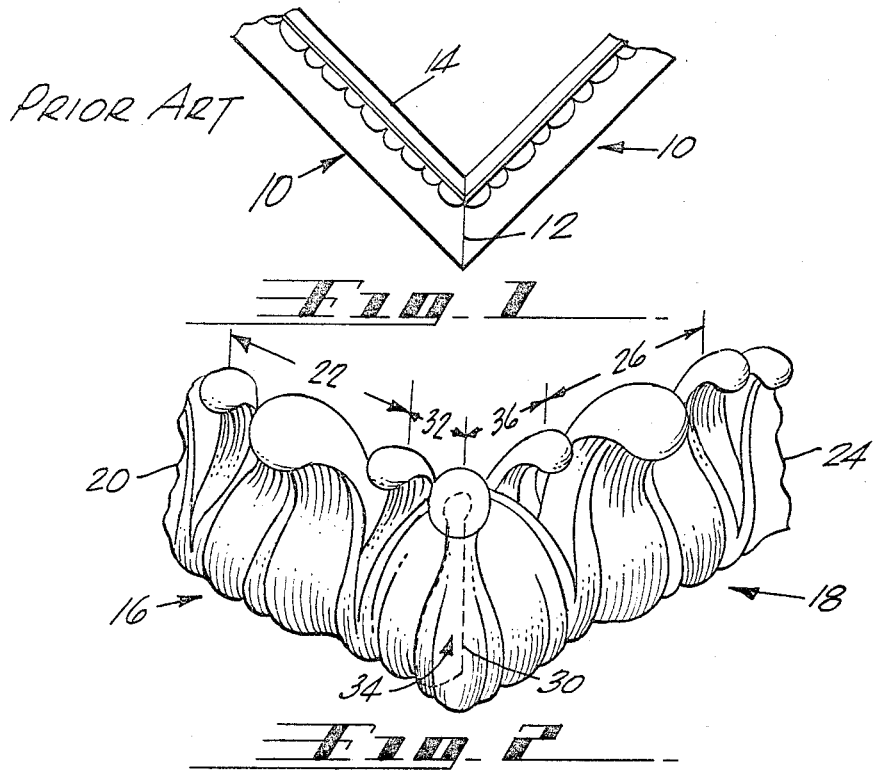
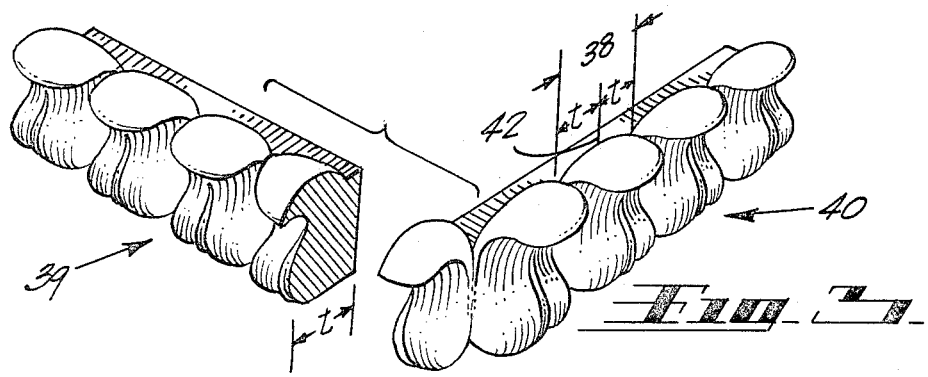
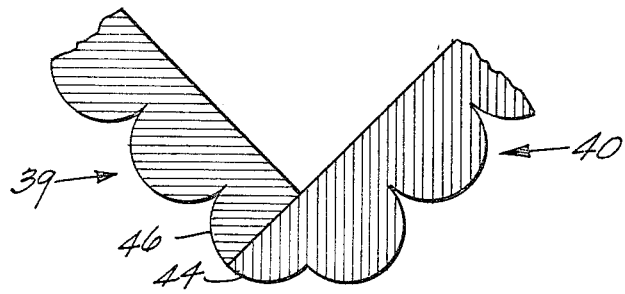
INVENTOR.
JACK D. BORTZ
BY Walter R. Thiel
-ATTORNEY- :::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::

3,379,462
MOLDING ASSEMBLY

Jack D. Bortz, Beverly Hills, Calif., assignor to U.S. Polymatrix, Inc., Venice, Calif., a corporation of California
Filed Feb. 1, 1966, Ser. No. 524,232
3 Claims. (Cl. 287—20.92)

ABSTRACT OF THE DISCLOSURE

This is a juncture for a two-piece molding assembly which has a repetitive symmetrical pattern. The juncture is formed without mitering the molding but merely by cutting one of the pieces along the center line of the symmetrical pattern and abutting it to the end of the other piece which contains the other part of the symmetrical pattern.

---

The present invention relates generally to a molding assembly and more particularly to a novel configuration for the ends of elongated pieces of molding constructed to permit sections of molding to be placed together without mitering the ends thereof.

The present interest in decorative furniture and surfaces coupled with the increased number of individuals interested in engaging in the construction of furniture has created the need for a simple and foolproof method of assembling strips of molding containing a decorative pattern.

Therefore, one object of the improved molding assembly of the present invention is to provide a decorative molding capable of easy assembly.

A further object of the present invention is to provide an improved decorative molding which may be assembled without the necessity of mitering the ends thereof.

An additional object of the present invention is to provide an improved decorative molding which is simple to assemble and inexpensive but has a decorative value substantially similar to handcarved moldings.

Briefly, the preferred embodiment of the present invention includes a pair of molding strips specifically designed so that they may be joined without mitering. To accomplish this, one of the strips is cut along a center line of the symmetrical pattern and the other strip contains at each end one-half of a symmetrical pattern, thereby permitting one molding strip to be joined to the other strip with the decorative pattern continuing around the corner.

These and other objects and advantages of this invention will become apparent from the following description taken in accordance with the specification and considered in conjunction with the accompanying drawings throughout which like reference characters indicate like parts and in which:

FIGURE 1 is a plan view of a conventional assembly of decorative molding illustrating the prior art method of mitering the ends of such sections for assembly;

FIG. 2 is a perspective view of a portion of two elongated sections of decorative molding illustrating one embodiment of the improved molding assembly of the present invention and showing the transverse end surface of one section in dash lines to illustrate its position relative to the other section for forming a junction between the two sections;

FIG. 3 is an exploded view of a portion of two sections of decorative molding constructed in accordance with the principles of the improved molding assembly of this invention and illustrating a second embodiment thereof; and FIG. 4 is an enlarged fragmentary corner section of the second embodiment of the improved molding assembly illustrated in FIG. 3.

The teachings of the unique molding assembly of this invention are applicable to both right and left-hand junctures; that is, junctures formed at the right or left end of a section of molding. The choice of a right-hand juncture as illustrated in FIGURES 2, 3 and 4 and described in the specification was an arbitrary choice made for clarity only, since similar illustrations and descriptions could be made for a left-hand juncture.

Referring now to FIG. 1 the conventional method of forming a joint or corner between two sections of molding 10 is to miter the ends of the sections so that they can be brought together along a plane 12 at an angle substantially 45° with the longitudinal edges 14 of the molding 10. To accomplish this juncture in a way that will not detract from the decorativeness of the molding, it is necessary to cut the mitered corners with a special saw positioned in a miter box. Such junctures can only be made if such equipment is available and the operator is acquainted with its operation.

Shown in FIG. 2 is the improved molding assembly of the present invention wherein junctures are made in decorative molding sections which eliminate the necessity of having a special saw and a miter box. To form the juncture shown in FIG. 2 a first elongated member 16 or piece or section of molding is brought into contact with a second elongated member 18 or piece or section of molding as is common in the prior art, however, the transverse end of the first member has been formed in such a manner that it engages the second elongated member without the necessity of any cutting or shaping of either member.

The first elongated member 16 has a first major surface 20 containing a plurality of intermediate zones 22 each of which contains a pattern which, if desired, may be decorative or functional or both. In a like fashion the second elongated member 18 contains a first major surface 24 having intermediate zones 26 each containing a pattern which may be, if desired, substantially similar to the patterns of the first member. For two sections of molding to be assembled within the teachings of this invention only one major surface need be shaped in a decorative design, however, for aesthetic reasons such as shown in FIG. 2, three surfaces may be included within the design.

Typically, for mounting of the molding section to a flat surface, a second major surface 30 of both members 18, 20 has a flat planar shape.

The first major surface 20 of the first elongated member 16 also includes end zones 32 which contain less than a complete decorative pattern and which terminate in transverse end surfaces 34 which are substantially perpendicular to the second major surface 30. The second elongated member 18 also includes end zones 36 similar in construction to those of the first member, however, the transverse end surfaces of this member have been shaped into a pattern substantially similar to a portion of the decorative pattern of the intermediate zones 26. Thus, when the transverse surface 34 of the first elongated member 16 is brought into contact with the second major surface of the second elongated member 18 substantially adjacent to the edge of this surface the decorative pattern of the transverse end surface of the second elongated member forms a portion of the decorative pattern and creates a decorative edge or corner such as shown in FIG. 2.

Referring now to FIGS. 3 and 4, a second embodiment of the molding assembly of the present invention is illustrated wherein the pattern in each of the intermediate zones 38 contained in the first and second elongated members 39, 40 is substantially symmetrical about a center line 42 of each of the zones 38 and the elongated members 39, 40 have a thickness $t$ approximately equal to the dimension of one-half of each of the intermediate zones 38. In this embodiment the decorative pattern 44 of the transverse end surfaces of the second elongated member 40 is substantially similar to one of the symmetrical portions of the intermediate zones 38 so that if the first elongated member 39 is cut along the center line of a zone into a pattern 46 and brought into contact with the second major surface of the second elongated member 40 the formation of the decorative pattern at the point of contact of the two members is substantially identical to the patterns in each of the zones except that the pattern will be folded at an angle substantially 90 degrees of arc.

While the improved molding assembly of the present invention has been illustrated and described as forming a corner or juncture at an angle substantially 90 degrees of arc, it should be understood that the principles and teachings of this invention are applicable as well to corners formed at other angles. In addition, while two embodiments of this invention have been herein illustrated it will be appreciated by those skilled in the art that variations in the disclosed arrangement both as to details and as to the organization of such details may be made without departing from the spirit and scope thereof. Accordingly, it is intended that the foregoing disclosure and the showings made in the drawings will be considered only as illustrative of the principle of the invention and not construed in a limiting sense.

What is claimed is:
1. A molding assembly comprising:
   a first elongated member including a first major surface having a plurality of intermediate zones each of which contains at least two substantially symmetrical parts defining a pattern, a second major surface having a planar shape, end zones at the ends of said first surface each containing a symmetrical part of said pattern and terminating in transverse end surfaces substantially perpendicular to the second major surface of said first elongated member; and
   a second elongated member having a first major surface formed into a plurality of intermediate zones each of which contains a pattern substantially similar to that of said member and a second major surface having a planar shape, end zones at the ends of said first major surface containing less than a complete pattern and terminating in end surfaces each having a shape substantially similar to a symmetrical part of said pattern and a surface substantially parallel to the second major surface of the second elongated member,
   whereby the engagement of said transverse surface of said first member with said second major surface of said second member immediately adjacent the end of said second member forms a juncture between said members having a pattern substantially identical to the pattern of said intermediate zones.

2. The molding assembly of claim 1 wherein the decorative patterns in said end zones are substantially one-half of the symmetrical decorative pattern of said intermediate zones and are mirror images of each other.

3. The molding assembly of claim 1 wherein the intermediate zones have a width approximately double the thickness of said elongated members.

References Cited
UNITED STATES PATENTS 1,667,043    4/1928    Meyer _____ 287—20.92

FOREIGN PATENTS 1,275,026    9/1961    France.

MARION PARSONS, JR., *Primary Examiner.*